Figure 3:
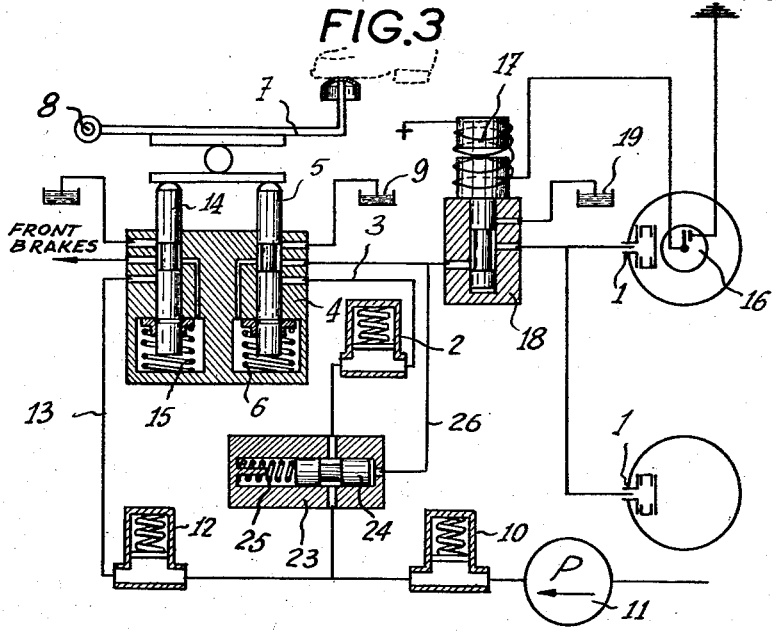

July 4, 1961 E. HENRY-BIABAUD 2,991,131
SKID-PREVENTING VEHICLE BRAKING SYSTEMS
Filed April 15, 1959 2 Sheets—Sheet 1
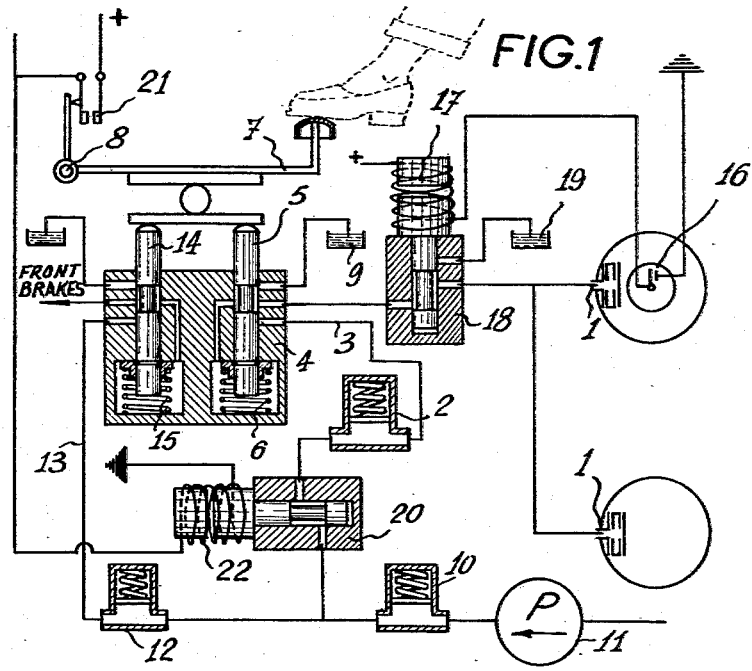
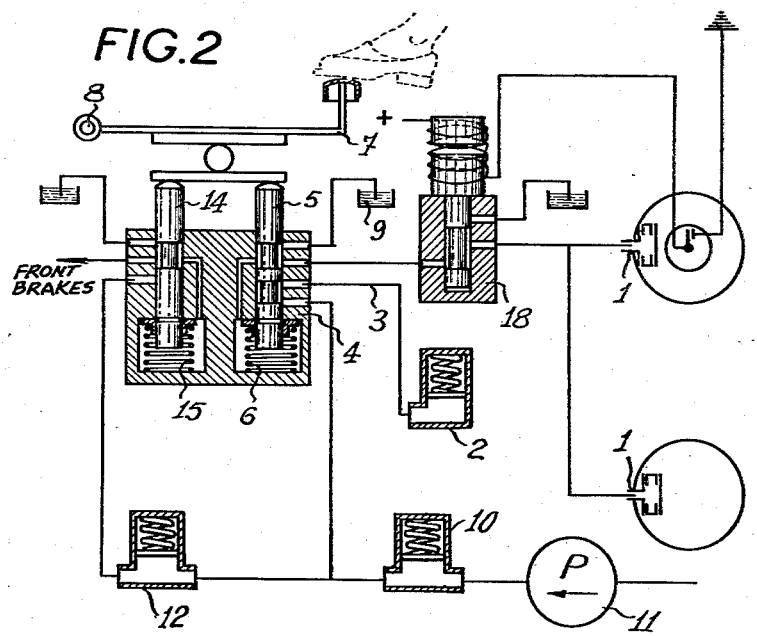

July 4, 1961  E. HENRY-BIABAUD  2,991,131

SKID-PREVENTING VEHICLE BRAKING SYSTEMS

Filed April 15, 1959  2 Sheets-Sheet 2

United States Patent Office 2,991,131
Patented July 4, 1961

2,991,131
SKID-PREVENTING VEHICLE BRAKING SYSTEMS
Edmond Henry-Biabaud, Paris, France, assignor to Société Anonyme Andre Citroen, Paris, France, a French company
Filed Apr. 15, 1959, Ser. No. 806,595
Claims priority, application France Apr. 16, 1958
6 Claims. (Cl. 303—24)

This invention relates to motor vehicle braking systems, and more particularly to arrangements that have recently come into use in connection with such systems for preventing an excessively violent application of the brakes and a "blocking" of the wheels, with a consequent dangerous skidding of the vehicle and other objectionable effects.

In view of the high speed of modern motor vehicles and the stringent requirements of driving safety, high-powered braking systems have to be provided on present-day cars. While a powerful braking mechanism is an imperative requisite, it brings with it the attendant danger that excessively sudden application of strong brakes, especially on a wet and slippery road surface, will result in skidding of the vehicle, thereby both reducing the effectiveness of the brakes in bringing the vehicle to a prompt stop, and introducing a grave hazard in imparting uncontrollable swerving motions to the vehicle.

To overcome this situation and prevent a positive blocking of the wheels by violent over-braking while still permitting a maximum application of the brakes consistent with safety, it has been proposed to provide inertia switch means associated with a wheel of the vehicle and responsive to the rate of deceleration thereof in response to braking, to actuate an electric control circuit acting to cut off the braking pressure in the event that the rate of deceleration exceeds a prescribed safety limit indicative of wheel blocking. When the blocking of wheel rotation is removed as a consequence of the operation of the inertia device, the reaction force from the road surface re-accelerates the wheel and braking pressure is re-applied.

Conventional wheel block preventing arrangements of this kind have been subject to the drawback that, upon repeated operation of the inertia switch due to repeated deceleration of the wheels by the brakes, followed by acceleration of the wheels by the road surface reaction upon release of the brakes due to inertia switch action, and so forth, an objectionably unstable condition sets in producing jerks, chatter and repeated impacts on the vehicle frame.

It is the main object of this invention to avoid the above drawback of existing systems, and to provide a vehicle braking system wherein wheel block due to overbraking will be positively prevented, which will thus bring the vehicle to a stop more smoothly and efficiently than heretofore.

In accordance with a broad aspect of the invention, a vehicle braking system including wheel brake actuators, a source of braking pressure, operator actuated means for connecting said pressure source to said actuators to apply the brakes, and deceleration-responsive means associated with a wheel and operative in response to wheel deceleration exceeding a prescribed rate to relieve said braking pressure from the actuator, is further provided with means for incrementally decreasing the pressure supplied from said source to said actuators at each operation of the deceleration-responsive means.

In accordance with a preferred aspect of the invention, the vehicle braking system has the means for incrementally decreasing the pressure supplied from the source to the actuators in the form of cut-off valve means automatically actuated on operation of the operator actuated control valve means for incrementally decreasing the pressure applied from said supply to said actuators at each operation of the deceleration-responsive means.

Where the pressure supply is an intermediate pressure fluid accumulator normally connected to a pressure fluid source such as a main pressure accumulator, the pressure-decreasing means preferably is in the form of a cut-off valve interposed in the connection between the main accumulator and the intermediate accumulator and automatically operable on operation of the control valve to cut off said connection.

In one practical embodiment of such a system, the cut-off valve may be solenoid-operated on depression of the brake pedal, e.g. through action of the same pedal-operated switch as that conventionally serving to control the rear stop lights of the vehicle.

In a modified embodiment, the cut-off valve may be pressure-operated on depression of the brake pedal by a pressure fluid connection with the outlet of the control valve.

In a further modification, the cut-off valve may be incorporated within the control valve itself.

Figure 4:
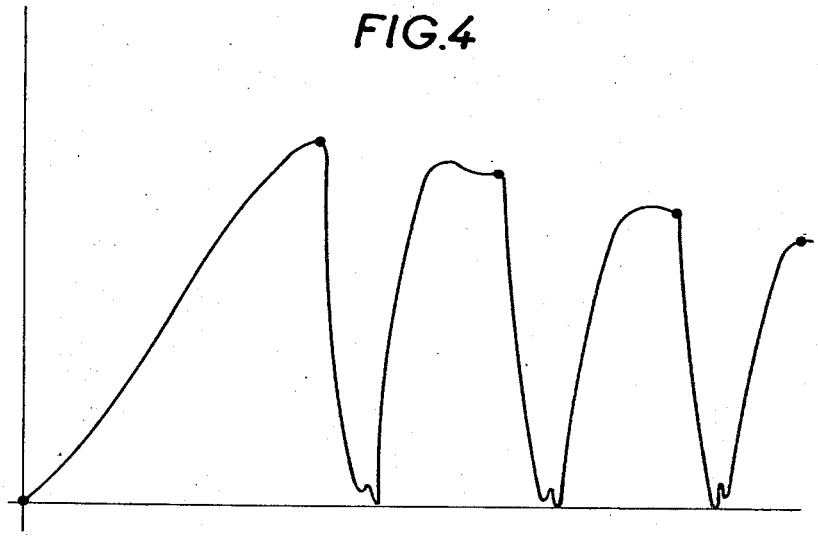

The three above mentioned illustrative embodiments of the invention will now be described in greater detail with reference to the accompanying drawings, wherein:

FIGS. 1 to 3 are highly schematic diagrams of three embodiments of the invention; and FIG. 4 is a graph showing the relationship of braking pressure versus time as obtained with a system embodying the invention.

Referring first to FIG. 1, there is schematically illustrated an hydraulic braking system for a motor vehicle, which is generally of conventional form, and includes a pair of rear wheel brake cylinders or actuators 1. The brake actuators 1 are both connected with a rear-wheel pressure accumulator 2 by way of a line 3 in which is interposed a control valve actuated by means of a brake pedal 7. The control valve comprises a ported casing 4 having a bore in which a grooved valve spool 5 is slidable. The valve spool is urged in one direction by a spring 6 and is operated in the opposite direction by foot action on a pedal 7 which is swingable on a fixed pivot 8. In a normal condition the valve spool groove connects the actuators 1 with the sump indicated at 9. When valve spool 5 is displaced by depression of brake pedal 7 in opposition to spring 6, the actuators 1 are connected with the pressure accumulator 2.

Rear accumulator 2 is connected in turn with a main pressure accumulator 10 by way of a solenoid valve 20 which is hereinafter described in greater detail. The main accumulator 10 is supplied with pressure fluid from a pump 11. Also connected with main accumulator 10 is a front wheel pressure accumulator 12. This in turn is connected by an outlet line 13 with the front wheel brake actuators (not shown) by way of a further control valve similar to that first described and provided as a common unit therewith in the body 4. This front wheel brake control valve comprises a valve spool 14 slidable in a bore of body 4 parallel to the bore in which spool 5 is slidable, and which is similarly adapted to be urged in the braking direction by depression of the brake pedal 7 in opposition to a spring 15.

Means are provided for momentarily cutting off brake pressure in case the wheels are subjected to an excessive rate of deceleration due to over-braking. Such means comprise a solenoid operated cut-off valve 18 interposed in the brake line between rear brake actuators 1 and control valve 4. Cut-off valve 18 comprises a ported casing in which a grooved valve spool is slidable, the spool forming part of the armature of a solenoid 17. Normally the spool is maintained e.g. by a spring (not shown), in a position to provide communication between the actuators 1 and the working port of control valve 4. However, on energization of solenoid 17 the spool cuts off such communication and, instead, connects the actuators 1 with the sump shown at 19.

The solenoid 17 is energized from battery by way of a normally open inertia switch 16 associated with a rear wheel of the vehicle and responsive to deceleration of the wheel in excess of a prescribed rate to complete the energizing circuit for solenoid 17. Inertia switch 16 may, for example, be of the type disclosed in detail in my co-pending patent application for "Inertia Switch," filed April 15, 1959, and identified as Serial No. 806,707. In case of overbraking and "blocking" of the associated rear wheel, inertia switch 16 closes immediately to energize solenoid 17 and actuate cut-off valve 18 to unload the rear wheel brake actuators by exhaust of the braking fluid to sump 19. The blocked condition of the wheel is thereby removed, the wheels being reaccelerated by the reaction of the ground, and the inertia switch opens again for deenergizing solenoid 17 and permitting cut-off valve 18 to restore the braking pressure to the rear wheel actuators. The arrangement thus far described is more or less conventional and it has been found sometimes to result in repeated blocking and unblocking of the wheels owing to the full brake pressure being supplied at each opening of the inertia switch 16, with consequent objectionable jerky operation. In accordance with this invention therefore, means are provided whereby, at each opening of the inertia switch 16, the brake pressure applied to the wheels is lower by a definite incremental amount than it was the time before, thereby achieving smoother and more reliable braking of the vehicle.

In the form of construction shown in FIGURE 1, this means for incrementally reducing the braking pressure is formed by the solenoid-operated valve 20 interposed in the connecting line between rear-wheel accumulator 2 and main accumulator 10, and normally urged, by means, such as, a spring (not shown), to a position where such connection is uninterrupted, while energization of the solenoid 22 moves the valve to a position where the connection is cut off. The solenoid 22 is connected to the battery by an energizing circuit having solenoid 22 in series with a normally open switch 21 arranged to be actuated on depression of the brake pedal 7. Preferably, though not necessarily, switch 21 may be the same switch as that serving to light up the rear stop lights of the car. Thus, on depression of the brake pedal 7 by the driver, the valve spools 5 and 14 are actuated to apply pressure from the rear and front-wheel reservoirs 2 and 12 to the corresponding wheel brake actuators, and simultaneously switch 21 is closed, energizing solenoid 22 to actuate cut-off valve 20 so as to cut off the connection from the main pressure accumulator 10 to the rear accumulator 2. In case of overbraking, inertia switch 16 closes, energizing solenoid 17 to exhaust the braking pressure momentarily from the rear wheel actuators to the sump 19. As soon as the braking pressure is relieved, ground reaction again causes the wheels to accelerate and inertia switch 16 opens, deenergizing solenoid 17 and re-applying brake pressure to the wheel actuators. But, since the connection between main supply accumulator 10 and rear wheel accumulator 2 continues to be cut off by valve 20, the pressure available in accumulator 2 is reduced and pressure that is now applied is lower, by a definite amount, than it was initially. This process is repetitive, and FIGURE 4 illustrates the form of the braking pressure curve, versus time, that was obtained with one experimental system. On release of the brake pedal, switch 21 is opened, deenergizing solenoid 22 and opening valve 20 for reconnecting the rear-wheel accumulator 2 with main accumulator 10, so that pressure in accumulator 2 rapidly builds up to its full value in readiness for a subsequent braking operation.

FIGURES 2 and 3 illustrate two modifications of the braking system of the invention. All components similar to those in the system of FIGURE 1 are designated by the same reference numerals, and only the differences over the first embodiment will be described.

In the modification of FIGURE 2, solenoid cut-off valve 20 is omitted and its effect is replaced by forming the valve spool 5 so that, in its normal position, communication is established between the rear wheel accumulator 2 and supply accumulator 10, but when urged to braking position on depression of the pedal 7, such communication is cut off by a suitable land of the spool, cooperating with ports of the valve casing. The arrangement is believed to be sufficiently clear from the drawing to make further description unnecessary.

In the further modification of FIGURE 3, the solenoid-operated cut-off valve 20 of FIGURE 1 is replaced by a pressure-operated cut-off valve 23 interposed between rear wheel accumulator 2 and main accumulator 10 and in which a slidable grooved valve spool 24 is normally urged by a spring 25 to a position in which the connection between accumulators 2 and 10 is open. The end of valve casing 23 remote from that in which spring 25 is received to act on spool 24 has a connection by way of a line 26 with the pressure line between control valve 4 and valve 18 and through which braking pressure is supplied to the rear wheel actuators. Thus, on application of brake pressure, spool 24 is moved against spring 25 to cut off the connection between accumulators 10 and 2 just as in the embodiments of FIGURES 1 and 2.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

I claim:

1. In a vehicle braking system, the combination of wheel brake actuators, a source of fluid pressure, an intermediate fluid pressure accumulator, first conduit means connecting said accumulator with said source, second conduit means connecting said accumulator with said actuators, control valve means interposed in said second conduit means and being operator actuated to permit the supply of fluid pressure from said accumulator to said actuators for applying the brakes, deceleration-responsive means associated with a vehicle wheel and operative, in response to deceleration of the wheel at a rate exceeding a predetermined value, to close said second conduit means between said accumulator and actuators and to exhaust the fluid pressure from the latter, and cut-off valve means interposed in said first conduit means and being automatically operable upon actuation of said control valve means to completely close said first conduit means between said source and said accumulator and thus stop the supplying of fluid pressure from said source to said accumulator, whereby the pressure supplied from said accumulator to said actuators is incrementally decreased upon each operation of said deceleration-responsive means and remains at the decreased pressure so long as said control valve means is actuated.

2. In a vehicle braking system, the combination as in claim 1; wherein said cut-off valve means includes a valve member normally positioned to provide an open passage through said first conduit means, electromagnetic means energizable to move said valve member to a position closing said first conduit means for interrupting the connection between said source and said accumulator, and means operated simultaneously with said operator-actuated control valve means to energize said electromagnetic means.

3. In a vehicle braking system, the combination as in claim 2; wherein said means operated to energize said electromagnetic means includes a conventional rear stop light switch of the vehicle.

4. In a vehicle braking system, the combination as in claim 1; wherein said cut-off valve means includes a valve member normally positioned to provide an open passage through said first conduit means, pressure operated means for displacing said valve member to a position closing said first conduit means and thereby interrupting the connection between said source and said accumulator, and means exposing said pressure operated means to the pressure in said second conduit means between said control valve means and said deceleration-responsive means so that said valve member of the cut-off valve means is displaced to said position closing said first conduit means upon actuation of said control valve means.

5. In a vehicle braking system, the combination as in claim 1; wherein said control valve means and said cut-off valve means have a common valve housing and a common valve member movable in said housing.

6. In a vehicle braking system, the combination as in claim 5; wherein said valve housing has first and second ports communicating with said source and said accumulator, respectively, by way of said first conduit means, and said housing further has a third port opening into said second conduit means and a fourth discharge port; and wherein said valve member is normally positioned to connect said first and third ports with said second and fourth ports, respectively, and is displaceable, upon actuation by the operator, to a position where said first and fourth ports are closed by said valve member and said second and third ports are connected.

References Cited in the file of this patent

UNITED STATES PATENTS 2,957,659     Yarber _____ Oct. 25, 1960

FOREIGN PATENTS 704,925     Great Britain _____ Mar. 3, 1954